United States Patent
Ivans et al.

(10) Patent No.: US 9,981,734 B2
(45) Date of Patent: May 29, 2018

(54) CROSS-WING DRIVESHAFT CHANNEL

(71) Applicant: Bell Helicopter Textron Inc., Fort Worth, TX (US)

(72) Inventors: Steven Ivans, Ponder, TX (US); Adam Anderson, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 143 days.

(21) Appl. No.: 15/269,278

(22) Filed: Sep. 19, 2016

(65) Prior Publication Data

US 2018/0079483 A1    Mar. 22, 2018

(51) Int. Cl.
| | |
|---|---|
| *B64C 3/34* | (2006.01) |
| *B64C 3/32* | (2006.01) |
| *B64C 29/00* | (2006.01) |
| *B64D 35/04* | (2006.01) |
| *B64D 37/04* | (2006.01) |
| *B64D 37/06* | (2006.01) |
| *B64C 3/26* | (2006.01) |

(52) U.S. Cl.
CPC .......... *B64C 3/34* (2013.01); *B64C 3/26* (2013.01); *B64C 3/32* (2013.01); *B64C 29/0033* (2013.01); *B64D 35/04* (2013.01); *B64D 37/04* (2013.01); *B64D 37/06* (2013.01)

(58) Field of Classification Search
CPC .......... B64C 1/14; B64C 1/1446; B64C 3/00; B64C 3/26; B64C 3/32; B64C 3/34; B64C 29/00; B64C 29/0033; B64D 35/04; B64D 37/04; B64D 37/06
See application file for complete search history.

(56) References Cited

U.S. PATENT DOCUMENTS

| | | | | |
|---|---|---|---|---|
| 1,499,817 A | * | 7/1924 | Fokker | B64D 37/04 |
| | | | | 244/135 R |
| 1,919,682 A | | 7/1933 | Bellanca | |
| 2,478,847 A | * | 8/1949 | Stuart | B64C 29/0033 |
| | | | | 244/233 |
| 2,621,001 A | * | 12/1952 | Roman | B64C 29/0033 |
| | | | | 244/12.4 |

(Continued)

FOREIGN PATENT DOCUMENTS

| | | |
|---|---|---|
| EP | 2778063 A1 | 9/2014 |
| EP | 3296213 A1 | 3/2018 |

OTHER PUBLICATIONS

European Search Report, dated Dec. 21, 2017, by the EPO, re EP application No. 17191747.9.

(Continued)

*Primary Examiner* — Richard R Green
*Assistant Examiner* — Michael A. Fabula
(74) *Attorney, Agent, or Firm* — Timmer Law Group, PLLC (57) ABSTRACT

An aircraft wing including a fuel tank located in the wing, a channel defining a cavity in the fuel tank, the channel including at least two channel ends terminating at an upper or lower wing surface, a driveshaft located in the cavity; and an access panel located on the wing surface and being movable between an open position so that access to the cavity is permitted, and a closed position so that the cavity is at least partially covered by the access panel to inhibit access to the cavity.

20 Claims, 6 Drawing Sheets

(56) References Cited

U.S. PATENT DOCUMENTS

| | | | | |
|---|---|---|---|---|
| 2,708,081 | A * | 5/1955 | Dobson | B64C 29/0033 244/7 C |
| 2,806,665 | A * | 9/1957 | Gibson | B64D 37/06 244/135 R |
| 3,136,499 | A * | 6/1964 | Kessler | B64C 11/34 244/60 |
| 3,181,810 | A * | 5/1965 | Olson | B64C 29/0033 244/66 |
| 3,567,157 | A * | 3/1971 | Dancik | B64C 29/0033 244/12.4 |
| 3,884,431 | A * | 5/1975 | Burrell | B64C 27/24 244/12.3 |
| 4,880,071 | A * | 11/1989 | Tracy | B64C 29/0033 180/117 |
| 4,925,131 | A * | 5/1990 | Eickmann | B64C 11/28 244/123.9 |
| 5,642,982 | A * | 7/1997 | Matuska | B64C 11/003 416/87 |
| 5,863,013 | A * | 1/1999 | Schmittle | B64C 3/385 244/104 LS |
| 8,083,172 | B2 * | 12/2011 | Karem | B64C 29/0033 244/7 C |
| 8,844,879 | B2 | 9/2014 | Santini | |
| 8,950,698 | B1 * | 2/2015 | Rossi | B64C 37/02 244/2 |
| 9,346,554 | B2 | 5/2016 | James | |
| 9,783,292 | B2 * | 10/2017 | Kooiman | B64C 29/0033 |
| 2006/0202081 | A1 * | 9/2006 | Milde, Jr. | B64C 3/56 244/12.1 |
| 2009/0224096 | A1 * | 9/2009 | Waide | B64C 29/0033 244/60 |
| 2009/0256026 | A1 * | 10/2009 | Karem | B64C 27/08 244/99.2 |
| 2009/0266941 | A1 * | 10/2009 | Karem | B64C 3/185 244/7 A |
| 2011/0177748 | A1 | 7/2011 | Luo | |
| 2014/0263855 | A1 * | 9/2014 | Ross | B64C 29/0075 244/7 A |
| 2016/0046382 | A1 * | 2/2016 | Alber | B64C 29/02 701/3 |
| 2016/0304195 | A1 * | 10/2016 | Alber | B64C 29/02 |
| 2017/0101176 | A1 * | 4/2017 | Alber | B64C 29/0033 |
| 2017/0137122 | A1 * | 5/2017 | Kooiman | B64C 29/0033 |
| 2017/0158323 | A1 * | 6/2017 | Ross | B64C 29/0033 |
| 2017/0174342 | A1 * | 6/2017 | Huang | B64C 29/0033 |
| 2017/0259905 | A1 * | 9/2017 | Kooiman | B64C 3/26 |
| 2017/0297698 | A1 * | 10/2017 | Alber | B64C 29/0033 |
| 2018/0022467 | A1 * | 1/2018 | Alber | B64D 35/04 |
| 2018/0044012 | A1 * | 2/2018 | Groninga | B64C 29/0033 |
| 2018/0044013 | A1 * | 2/2018 | Groninga | B64C 29/0033 |
| 2018/0057157 | A1 * | 3/2018 | Groninga | B64C 27/82 |
| 2018/0079483 | A1 * | 3/2018 | Ivans | B64C 3/34 |
| 2018/0079503 | A1 * | 3/2018 | Ivans | B64C 29/0033 |

OTHER PUBLICATIONS

European Exam Report, dated Mar. 16, 2018, by the EPO, re EP Patent Application No. 17191747.9.

* cited by examiner

CROSS-WING DRIVESHAFT CHANNEL

BACKGROUND

Technical Field

The present disclosure relates to a cross-wing driveshaft channel for an aircraft wing, and more particularly, to a tiltrotor aircraft wing.

Description of Related Art

One example of an aircraft is a tiltrotor. A tiltrotor aircraft may operate in a helicopter mode by positioning the nacelles upright and in an airplane mode by positioning the nacelles forward. The engine driving a rotor on one side of the aircraft can be configured to drive the rotor on the other side of the aircraft by linking the propulsion system with a cross-wing driveshaft. The cross-wing driveshaft runs from one propulsion and gearbox system through two inboard wings and into the other rotor propulsion and gearbox system. The cross-wing driveshaft can be located at various locations within the inboard wing depending on the type of tiltrotor aircraft. The inboard wing is typically filled with fuel in fuel tanks.

Figure 1:
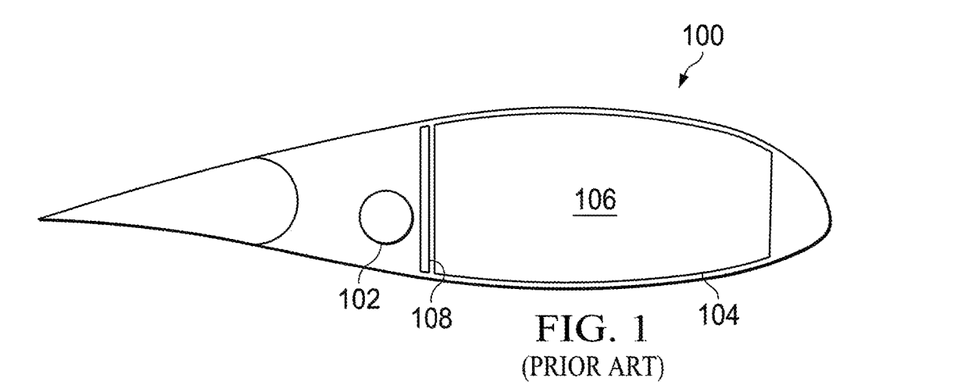
FIG. 1 is a cross-sectional schematic view of a prior art example of an inboard wing of a tiltrotor aircraft.

FIG. 1 shows an exemplary prior art tiltrotor aircraft wing 100 having a driveshaft 102 located at approximately 55-60% wing chord and a fuel tank 104 with fuel 106. A structural intercostal 108 is provided between the driveshaft area and the fuel cell area to separate the driveshaft from the fuel 106. In this prior art example, the cross-wing driveshaft is located in the aft portion of the wing and in a gap created by the structural intercostal 108. The gap created by the structural intercostal 108 limits the fuel storage capacity in the aft section of the wing.

Figure 2:
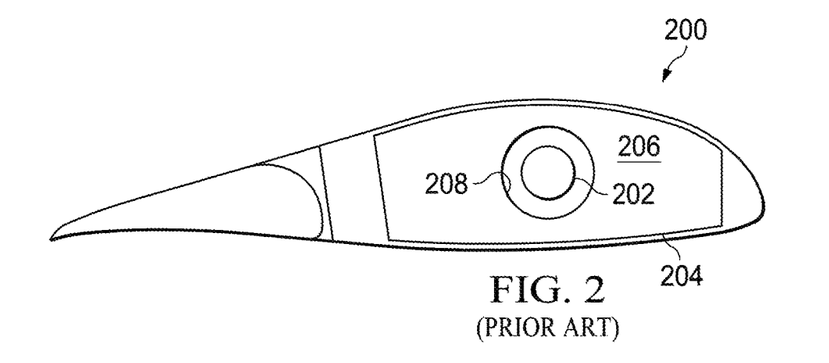
FIG. 2 is a cross-sectional schematic view of a prior art example of an inboard wing of a tiltrotor aircraft.

FIG. 2 shows a view of another exemplary prior art tiltrotor aircraft wing 200 having a driveshaft 202 located in a more forward position as compared to FIG. 1 and in the middle of the fuel tank 204. The driveshaft 202 runs through a tube 208 to separate the driveshaft 202 from the fuel 206. Access to the driveshaft 202 is very difficult and hazardous as the fuel 206 is first emptied and fuel fumes exhausted from the fuel tank 204 prior to any maintenance or inspection service. Moreover, removing the tube 208 covering the driveshaft 202 is an additional step that is required prior to servicing the driveshaft 202.

There is a need for improved access to a cross-wing driveshaft located in the forward area of a tiltrotor aircraft wing.

SUMMARY

In a first aspect, there is provided an aircraft wing having a wing surface including, a fuel tank located in the wing, a channel defining a cavity in the fuel tank, the channel including at least two channel ends terminating at the wing surface, a driveshaft located in the cavity; and an access panel located on the wing surface and being movable between an open position wherein access to the cavity is permitted, and a closed position wherein the cavity is at least partially covered by the access panel to inhibit access to the cavity.

In an exemplary embodiment, the aircraft wing is an inboard aircraft wing.

In one exemplary embodiment, the wing surface is an upper wing surface.

In another exemplary embodiment, the wing surface is a lower wing surface.

In yet another exemplary embodiment, the channel includes a first side surface and second side surfaces that extend to the channel ends.

In an exemplary embodiment, the first and second side surfaces are substantially parallel.

In still another exemplary embodiment, the first and second side surfaces are not parallel.

In another exemplary embodiment, the first and second side surfaces are substantially planar and at least one of the first or second side surfaces extends in a generally vertical direction.

In one exemplary embodiment, the first and second side surfaces are substantially planar and the first and second side surfaces extend in a generally vertical direction.

In another embodiment, the first side surface is in contact with the second side surface.

In still another embodiment, the channel includes a base surface in contact with the first and second side surfaces.

In an exemplary embodiment, the base surface is curved.

In one exemplary embodiment, the channel has a U-shape.

In yet another embodiment, the driveshaft is located from about 20% to about 45% of the total wing chord.

In an exemplary embodiment, the driveshaft is located from about 25% to about 40% of the total wing chord.

In another exemplary embodiment, the driveshaft is located from about 25% to about 35% of the total wing chord.

In an exemplary embodiment, the channel ends are adjacent to the access panel.

In another exemplary embodiment, the wing includes a plurality of wing supports to provide primary structural support to the wing.

In still another exemplary embodiment, the channel spans the plurality of wing supports.

In one exemplary embodiment, the distal end of the channel terminates at the outermost wing support.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the apparatus and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 3:
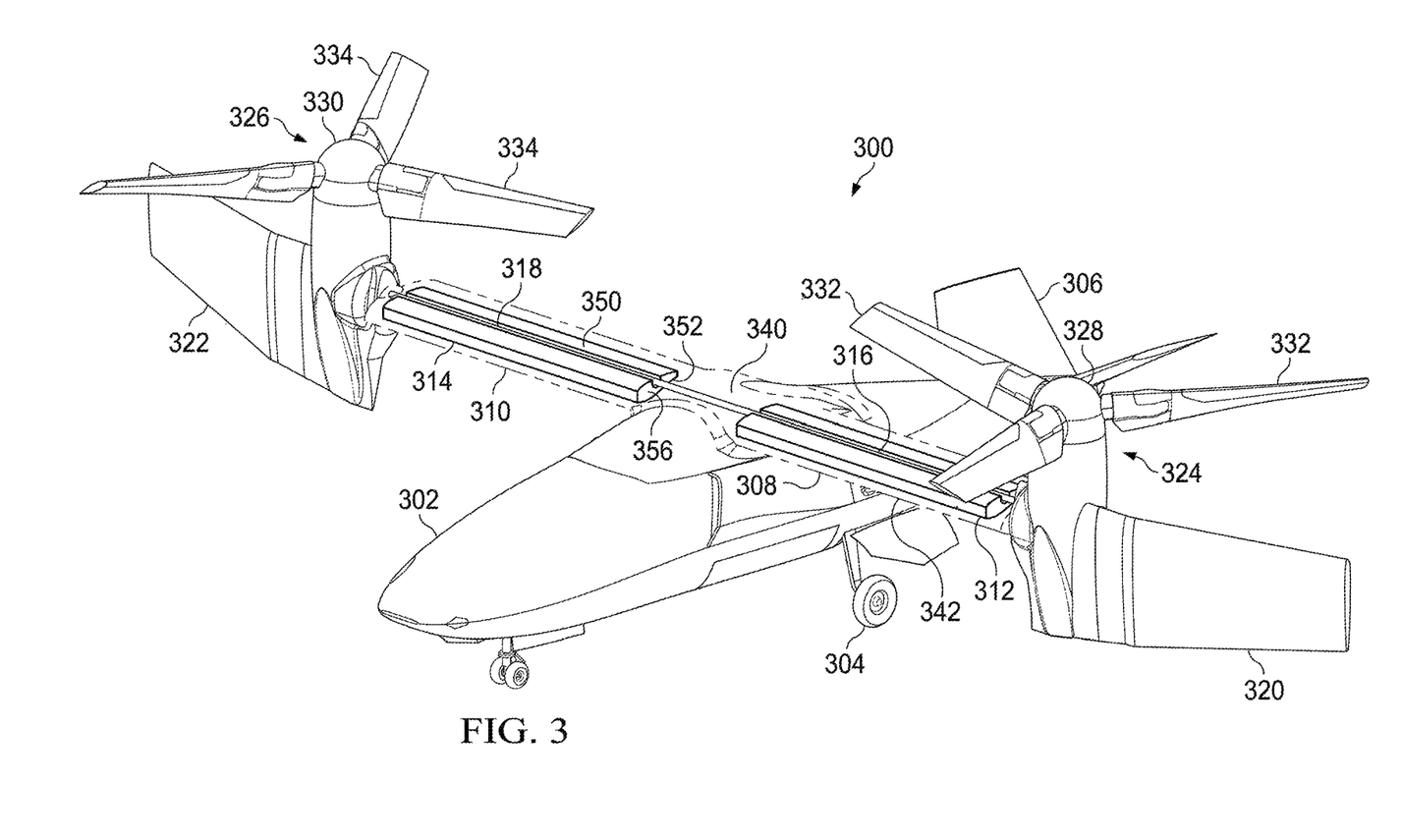
FIG. 3 is a perspective view of a tiltrotor aircraft in helicopter mode, according to one example embodiment.
Figure 4:
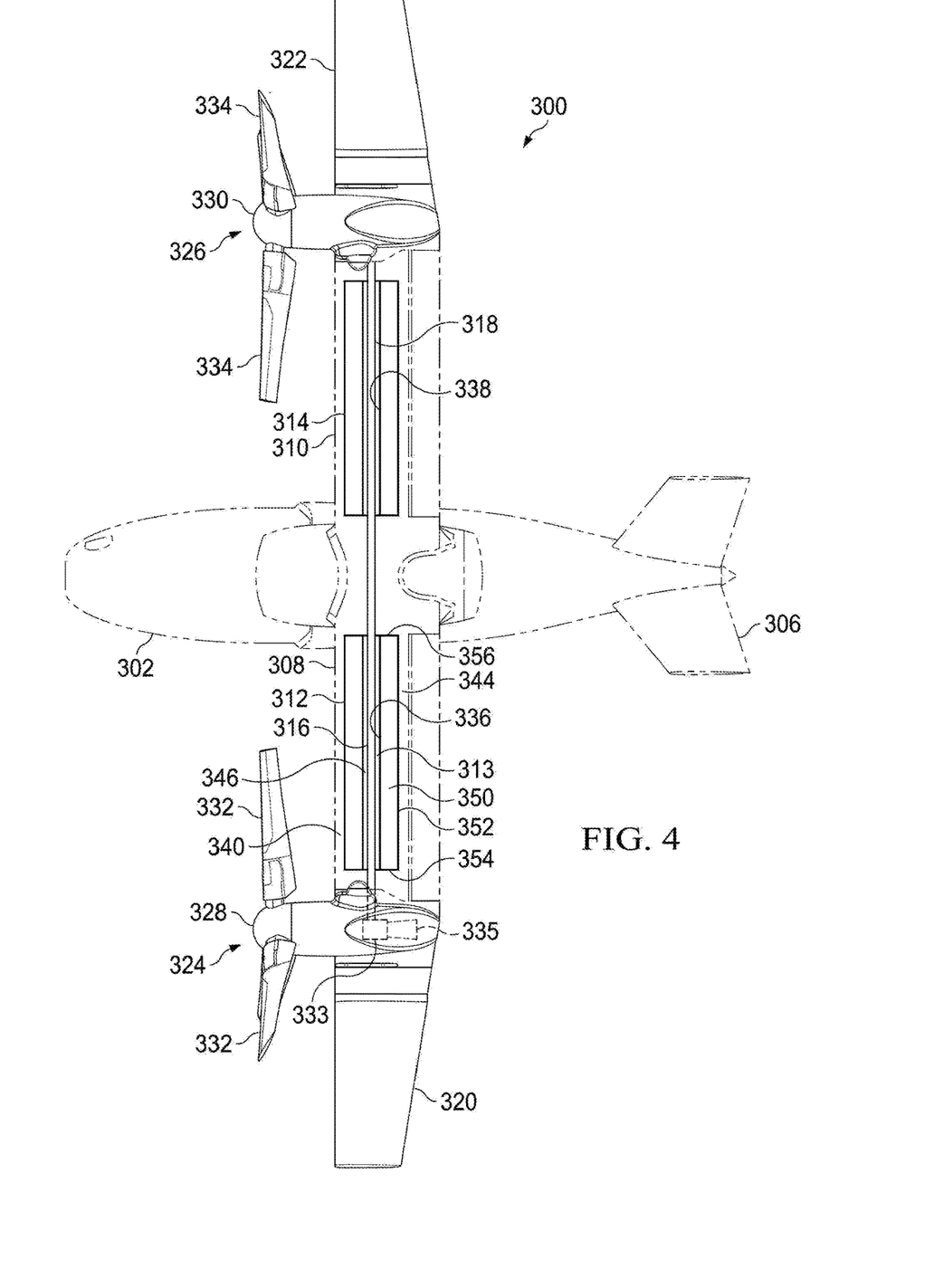
FIG. 4 is a top view of a tiltrotor aircraft in airplane mode, according to one example embodiment.

Referring to FIGS. 3 and 4 in the drawings, a tiltrotor aircraft 300 is illustrated. Tiltrotor aircraft 300 can include a fuselage 302, a landing gear 304, a tail member 306, an inboard wing 308, an inboard wing 310, a fuel tank 312, a fuel tank 314, a cross-wing driveshaft 316, a cross-wing driveshaft 318, an outboard wing 320, an outboard wing 322, a propulsion system 324, and a propulsion system 326. Each propulsion system 324 and 326 includes a gearbox 333, an engine 335, and a rotatable proprotor 328 and 330, respectively. Each rotatable proprotor 328 and 330 has a plurality of rotor blades 332 and 334, respectively, associated therewith. The position of the proprotors 328 and 330 can be selectively controlled in order to selectively control direction, thrust, and lift of the tiltrotor aircraft 300. In one embodiment, the cross-wing driveshafts 316 and 318 are one continuous driveshaft. In another embodiment, the driveshaft 316 is separated from driveshaft 318 by a gearbox located in the fuselage 302 area.

FIG. 3 illustrates tiltrotor aircraft 300 in helicopter mode, in which proprotors 328 and 330 are positioned substantially vertical to provide a lifting thrust. FIG. 4 illustrates tiltrotor aircraft 300 in an airplane mode, in which proprotors 328 and 330 are positioned substantially horizontal to provide a forward thrust in which a lifting force is supplied by inboard wings 308 and 310, respectively. The outboard wings 320 and 322 shown in FIGS. 3 and 4 are each positioned vertically or horizontally with the proprotor 328 and 330, respectively, increase the wing span and wing aspect ratio, which thereby increases lift/draft ratio and aircraft efficiency and fuel economy as compared to a tiltrotor without outboard wings 320 and 322. It should be appreciated that tiltrotor aircraft can be operated such that proprotors 328 and 330 are selectively positioned between airplane mode and helicopter mode, which can be referred to as a conversion mode.

The inboard wing 308, the outboard wing 320, and propulsion system 324 is substantially symmetric to the inboard wing 310, the outboard wing 322, and the propulsion system 326; therefore, for sake of efficiency certain features will be disclosed only with regard to the inboard wing 308, the outboard wing 322, and propulsion system 324. However, one of ordinary skill in the art would fully appreciate an understanding of the inboard wing 310, the outboard wing 322, and the propulsion system 326 based upon the disclosure herein of the inboard wing 308, the outboard wing 320, and propulsion system 324.

Further, the inboard wings 308 and 310, the outboard wings 320 and 322, and propulsion systems 324 and 326 are illustrated in the context of tiltrotor aircraft 300; however, the inboard wings 308 and 310, the outboard wings 320 and 322, and propulsion systems 324 and 326 can be implemented on other tiltrotor aircraft. For example, an alternative embodiment may include a quad tiltrotor that has additional wing members aft of the inboard wings 308 and 310, the additional wing members can have additional outboard wings similar to the outboard wings 320 and 322, and propulsion systems similar to the propulsion systems 324 and 326. In another exemplary embodiment the stationary propulsion system is associated with the fuselage 302, where an engine located in the fuselage transfers power through a series of gears to both driveshafts 316 318 to deliver power to proprotors 328 and 330.

Inboard wings 308 and 310 can be integrated into a variety of tiltrotor aircraft configurations with or without outboard wings 320 and 322. Further, in another embodiment, the inboard wings 308 and 310 can be used with an unmanned version of tiltrotor aircraft 300.

The inboard wing 308 is located adjacent to, connected to, or near the fuselage 302. The inboard wing 308 includes an upper wing surface 340, a lower wing surface 342, aft section 344, and a forward section 346. The driveshaft 316 is disposed within the wing 308 and the distal end of the driveshaft 316 is in mechanical communication with a gearbox 333 and engine 335. The driveshaft 316 transfers power from an engine 335 in the propulsion system 324 to driveshaft 318, which transfers power to the propulsion system 326. Driveshafts 316 and 318 are each disposed within a channel 336 and 338, respectively.

The driveshaft 316 is located in a forward area of the wing from about 20% to about 45% of the total wing chord. In another example, the driveshaft 316 is located from about 25% to about 40% of the total wing chord. In still another example, the driveshaft 316 is located from about 25% to about 35% of the total wing chord. In one embodiment, the driveshaft is located in the thickest portion T of the wing. In another example, the driveshaft 316 is generally located in thickest portion T of a tiltrotor aircraft wing 308 having a single engine mounted to the fuselage 302.

Fuel tank 312 is a reservoir that stores fuel within the inboard wing 308. Fuel tank 312 may be integral with the housing of the wing 308 or separate from the wing structure 308. The fuel tank 312 is defined by an upper wall 350, a lower wall 352, and side walls 354 and 356. In one example, the fuel tank 312 is one or more fuel bags. The fuel tank 312 includes at least one port to connect with a fuel line for providing fuel to the engine 335.

Figure 5A:
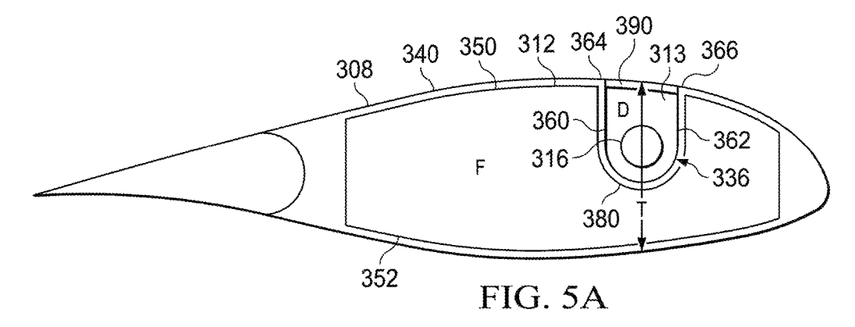
FIG. 5A is a cross-sectional schematic view of an inboard wing for a tiltrotor aircraft, according to one example embodiment.

FIG. 5A shows channel 336 within the wing 308 and fuel tank 312. Channel 336 defines a cavity 313 within the fuel tank 312. The channel 336 separates the fuel in the fuel tank 312 from the driveshaft 316 by creating a physical barrier between the fuel area F and the driveshaft area D. The cavity 313 provides adequate space for the driveshaft 316 to operate and maximizes the amount of space available for fuel without compromising accessibility to the driveshaft 316.

The distal end of the channel 336 terminates within the inboard wing 308 at the outboard end of the wing near the junction with propulsion system 324. The channel 336 and 338 can have ends terminating at the inboard end of the wing 308 just outboard of where the structural attachment of the wing 308 to the fuselage 302 occurs and where the fuel tank 312 ends.

Figure 6:
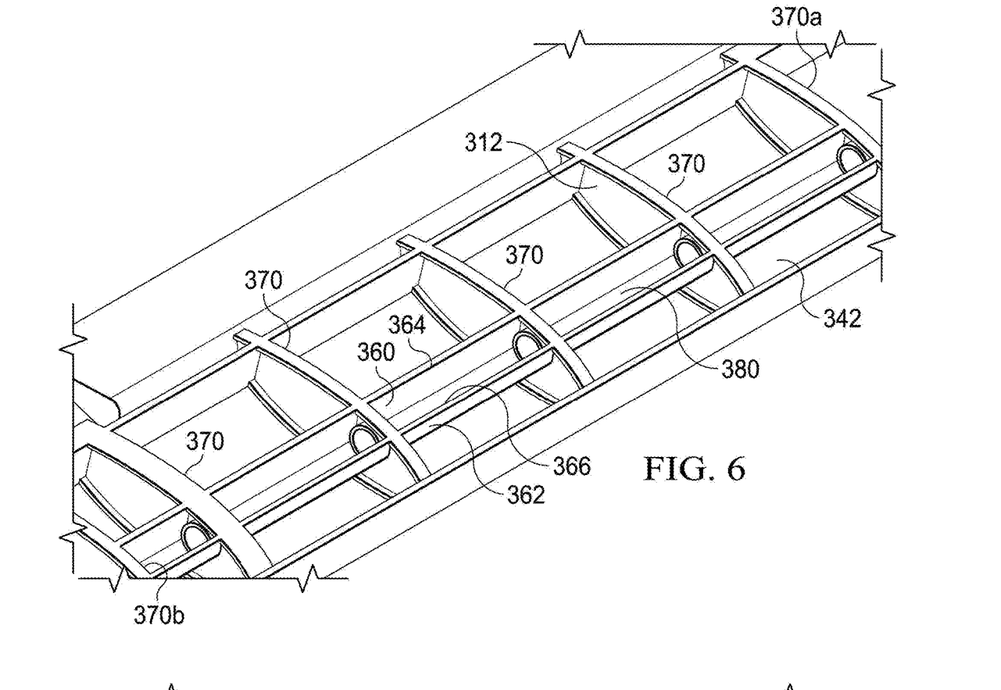
FIG. 6 is partial perspective view of an inboard wing for a tiltrotor aircraft including a channel 336 and a plurality of wing supports 370 without the upper wing surface 340 and driveshaft 316, according to one example embodiment.

FIGS. 5A and 6 show channel 336 including first and second side surfaces 360 and 362 that terminate at channel ends 364 and 366, respectively, located at a wing 308 surface, which can be the upper and lower wing surfaces 340 and 342, respectively. The first and second side surfaces 360 and 362 extend vertically from a base 380 to the channel ends 364 and 366. In an embodiment, the side surfaces 360 and 362 are substantially parallel. In yet another embodiment, the side surfaces 360 and 362 are substantially planar and the first and second side surfaces 360 and 362 extend in a vertical direction from the base 380. In an exemplary embodiment, the channel 336 is a U shaped channel. An exemplary embodiment provides that the side surfaces 360 and 362 with ends 364 and 366 terminating at the upper wing surface 340 are separate from the lower wing surface 342.

The base 380 can be curved, substantially semi-circular, planar, or other suitable shape for connecting with each of the side surfaces 360 and 362. An exemplary embodiment provides that the base 380 does not contact a wing surface, for example, the base 380 is not connected to or is otherwise separated from the upper or lower wing surface 340 and 342, respectively.

FIG. 6 illustrates a plurality of wing supports 370 in the fuel tank 312 to provide primary structural support for the inboard wing 308. The wing supports 370 can be integrally formed with the channel 336 as one piece or as several pieces that can be aligned and secured together to form the plurality of wing supports 370. In another embodiment, the channel 336 is formed of a single unitary sheet and bent to form first side surface 360, base 380, and second side surface 362, and adhered, riveted, or otherwise attached in a suitable manner to the wing supports 370. In yet another embodiment, the channel is formed of more than one sheet of suitable material to form the first side surface 360, base 380, and the second side surface 362, the sheets formed to the needed shape and adhered, riveted, or otherwise attached in a suitable manner to the wing supports 370.

In one embodiment, the distal end of channel 336 terminates at the most outboard or outermost wing support 370a, which is also known as the tip-rib, and extends through the wing 308 to the most inboard wing support 370b adjacent to or near the fuselage 302. In another embodiment, the distal end of the channel 336 is at the end of the fuel tank 312. The channel 336 can terminate where the fuel tank 312 terminates. In one embodiment, the channel 336 terminates at tank side walls 354 and 356.

In another embodiment, the channel 336 is a secondary support structure that attaches to and spans the wing supports 370. In one embodiment, the wing supports 370 are wing ribs.

Figure 7:
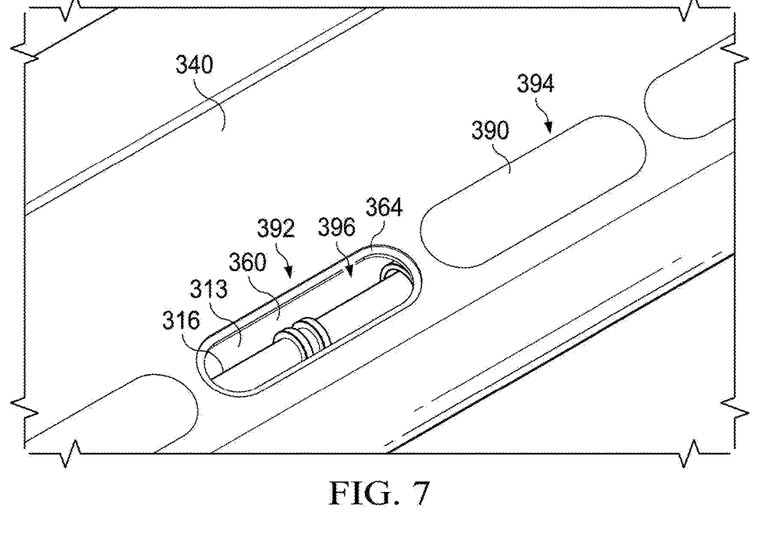
FIG. 7 is a partial perspective view of an inboard wing for a tiltrotor aircraft, according to one example embodiment.

The channel 336 forms the cavity 313 in the fuel tank 312 so as to permit access to the driveshaft 316 through an access panel 390 in a wing surface as shown in FIG. 7. The access panel 390 is located on at least one of the upper or lower wing surface 340 and 342, respectively, as shown in FIGS. 5A and 7. The access panel 390 is movable between an open position 392 that permits access to the cavity 313 and a closed position 394 so that the cavity 313 is at least partially covered by the access panel 390 to inhibit access to the cavity 313. In one embodiment, the cavity 313 is covered by the access panel 390 to inhibit access the cavity 313. The access panel 390 can be secured to the wing surface 308 in any suitable manner, e.g., bolted, screwed, adhered, etc. In one embodiment shown in FIG. 7, the access panel 390 is received in a recess 396 and bolted thereto so the access panel 390 is flush with the wing surface 340. An embodiment includes the channel ends 364 and 366 adjacent to the access panel 390. In another embodiment the channel ends 364 and 366 include a recess to receive the access panel 390.

Figure 5B:
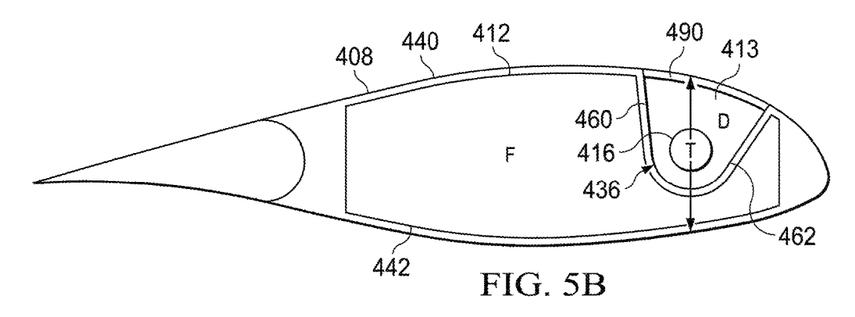
FIG. 5B is a cross-sectional schematic view of an inboard wing for a tiltrotor aircraft, according to one example embodiment.

FIG. 5B shows an example of the channel 336 in the inboard wing 308. Certain components of the inboard wing 308 are as described above in connection with the inboard wing 308. Those components bear similar reference characters to the components of the inboard wing 308, but with a leading '4' rather than a leading '3'. The channel 436 includes the first and second side surfaces 460 and 462, respectively. As shown in FIG. 5B, the first and second side surfaces 460 and 462 are not parallel and provides a larger cavity area 413 for accessing the driveshaft 416. In an example, the side surfaces 460 and 462 are substantially planar and at least one of the first and second surfaces 460 and 462 extends in a generally vertical direction. An exemplary embodiment includes at least one of the first and second side surfaces 460 and 462 extending in an orientation transverse to the longitudinal axis of the inboard wing 408.

Figure 5C:
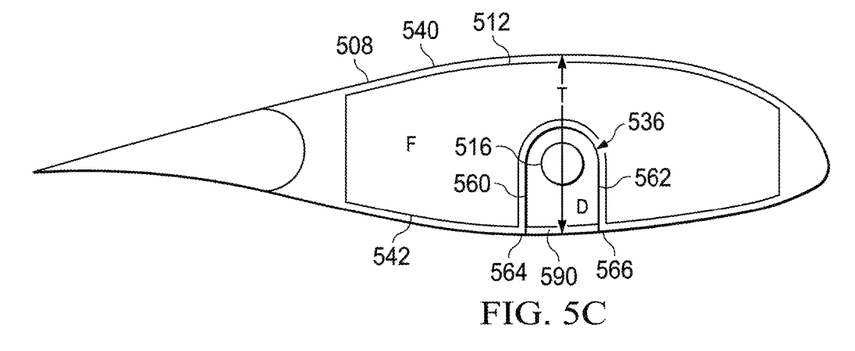
FIG. 5C is a cross-sectional schematic view of an inboard wing for a tiltrotor aircraft, according to one example embodiment.

FIG. 5C is another example of the channel 336 in the inboard wing 308. Certain components of the inboard wing 308 are as described above in connection with the inboard wing 308. Those components bear similar reference characters to the components of the inboard wing 308, but with a leading '5' rather than a leading '3'. The channel 536 includes the first and second side surfaces 560 and 562, respectively. The first and second side surfaces 560 and 562 terminate at channel ends 564 and 566, respectively, located at the lower wing surfaces 542 so that the driveshaft 516 can be accessed from the lower wing surface 542. Another exemplary embodiment provides that the side surfaces 560 and 562 with ends 564 and 566, respectively, terminate at the lower wing surface 542 and are separate from the upper wing surface 540.

Figure 5D:
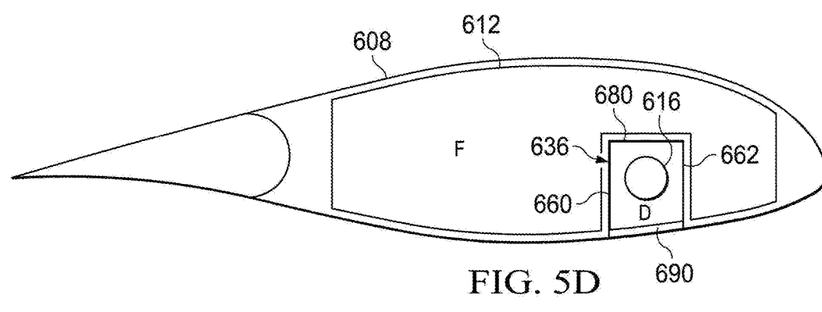
FIG. 5D is a cross-sectional schematic view of an inboard wing for a tiltrotor aircraft, according to one example embodiment.

FIG. 5D is still another example of the channel 336 in the inboard wing 308. Certain components of the inboard wing 308 are as described above in connection with the inboard wing 308. Those components bear similar reference characters to the components of the inboard wing 308, but with a leading '6' rather than a leading '3'. The channel 636 includes the first and second side surfaces 660 and 662 and a base 680, respectively. The base 680 is planar and is connected to the side surfaces 660 and 662 at generally about a right angle.

Figure 5E:
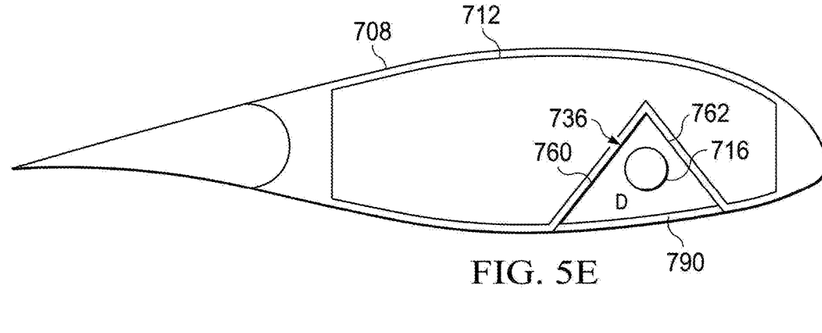
FIG. 5E is a cross-sectional schematic view of an inboard wing for a tiltrotor aircraft.

FIG. 5E is one example of the channel 336 in the inboard wing 308. Certain components of the inboard wing 308 are as described above in connection with the inboard wing 308. Those components bear similar reference characters to the components of the inboard wing 308, but with a leading '7' rather than a leading '3'. The channel 736 includes the first and second side surfaces 760 and 762, respectively. In this example, the first side surface 760 directly contacts the second surface 762; a base is not required.

The illustrative embodiments of the cross-wing driveshaft channel described herein advantageously provide improved fuel storage capacity in the aft section of the wing while providing convenient access to the cross-wing driveshaft.

At least one embodiment is disclosed and variations, combinations, and/or modifications of the embodiment(s) and/or features of the embodiment(s) made by a person having ordinary skill in the art within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 5 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

The invention claimed is:

1. An aircraft wing having a wing surface comprising:
   a fuel tank located in the wing,
   a channel defining a cavity in the fuel tank, the channel comprising at least two channel ends terminating at the wing surface,
   a driveshaft located in the cavity; and
   an access panel located on the wing surface and being movable between an open position wherein access to the cavity is permitted, and a closed position wherein the cavity is at least partially covered by the access panel to inhibit access to the cavity.

2. The aircraft wing of claim 1, wherein the aircraft wing is an inboard aircraft wing.

3. The aircraft wing of claim 1, wherein the wing surface is an upper wing surface.

4. The aircraft wing of claim 1, wherein the wing surface is a lower wing surface.

5. The aircraft wing of claim 1, further comprising a first side surface and second side surface of the channel, the first and second side surfaces extending to the channel ends.

6. The aircraft wing of claim 5, wherein the first and second side surfaces are substantially parallel.

7. The aircraft wing of claim 5, wherein the first and second side surfaces are not parallel.

8. The aircraft wing of claim 5, wherein the first and second side surfaces are substantially planar and at least one of the first or second side surfaces extends in a generally vertical direction.

9. The aircraft wing of claim 5, wherein the first and second side surfaces are substantially planar and the first and second side surfaces extend in a generally vertical direction.

10. The aircraft wing of claim 5, wherein the first side surface is in contact with the second side surface.

11. The aircraft wing of claim 5, further comprising a base surface in contact with the first and second side surfaces.

12. The aircraft wing of claim 11, wherein the base surface is curved.

13. The aircraft wing of claim 1, wherein the channel has a U-shape.

14. The aircraft wing of claim 1, wherein the driveshaft is located from about 20% to about 45% of the total wing chord.

15. The aircraft wing of claim 1, wherein the driveshaft is located from about 25% to about 40% of the total wing chord.

16. The aircraft wing of claim 1, wherein the driveshaft is located from about 25% to about 35% of the total wing chord.

17. The aircraft wing of claim 1, wherein the channel ends are adjacent to the access panel.

18. The aircraft wing of claim 1, further comprising a plurality of wing supports to provide primary structural support to the wing.

19. The aircraft wing of claim 18, wherein the channel spans the plurality of wing supports.

20. The aircraft wing of claim 19, wherein the distal end of the channel terminates at the outermost wing support.

* * * * *